April 28, 1964     F. KREIS     3,130,606

INFINITELY VARIABLE SPEED GEAR TYPE TORQUE CONVERTER

Filed Sept. 26, 1960     2 Sheets-Sheet 1

Inventor
Fritz Kreis

By Stevens Davis Miller & Mosher
Attorneys

April 28, 1964 F. KREIS 3,130,606
INFINITELY VARIABLE SPEED GEAR TYPE TORQUE CONVERTER
Filed Sept. 26, 1960 2 Sheets-Sheet 2
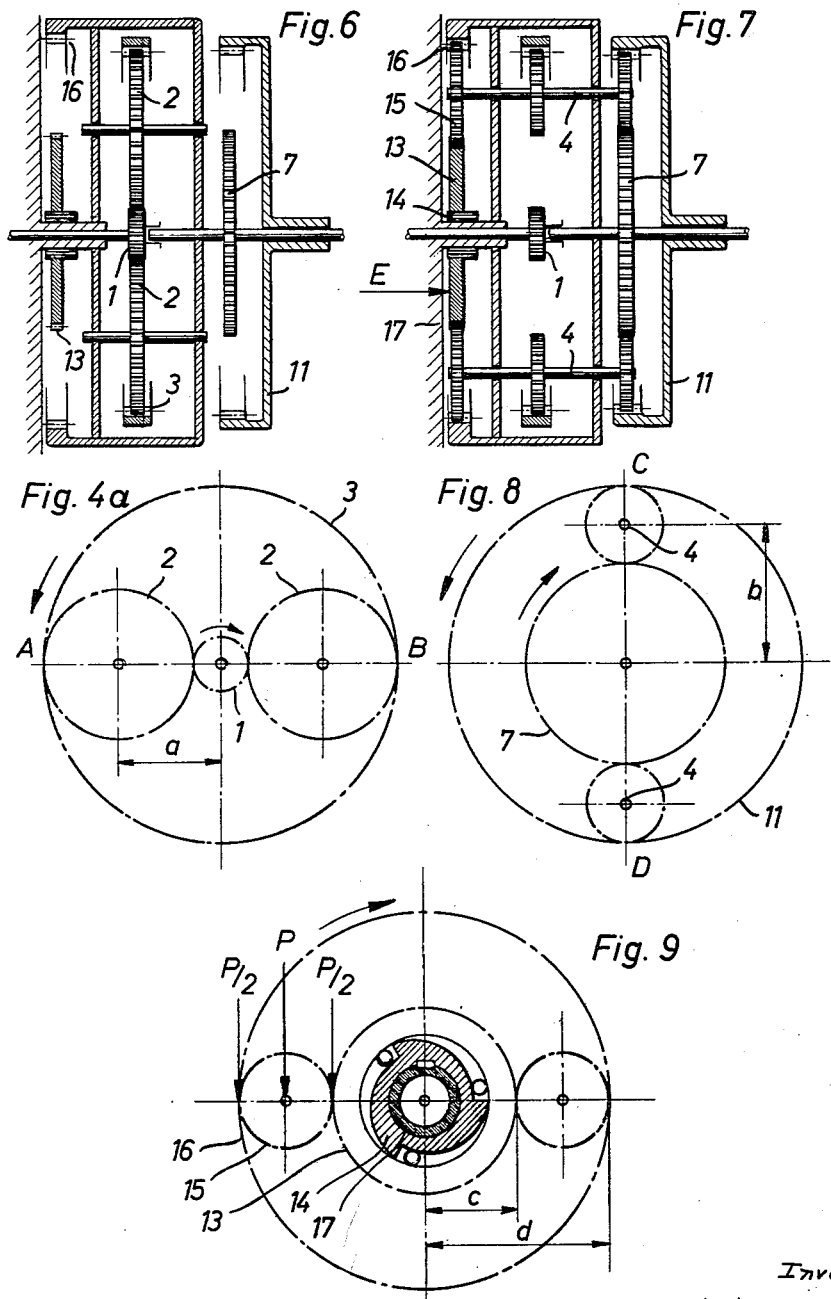
Inventor
Fritz Kreis
By Stevens Davis Miller & Mosher
Attorneys 3,130,606
INFINITELY VARIABLE SPEED GEAR TYPE
TORQUE CONVERTER
Fritz Kreis, Franziskanerplatz 5, Wurzburg, Germany
Filed Sept. 26, 1960, Ser. No. 58,225
Claims priority, application Germany Oct. 1, 1959
6 Claims. (Cl. 74—751)

The invention relates to an automatically operating torque and speed converter which is adapted exclusively to operate through gear wheels and which is nevertheless adapted, exactly like a hydraulic converter, to convert the various torques required at the output end and constantly to match them with the constant drive torque, this being done in a completely stepless manner between the maximum and zero. Thus, the speed conversion is also completely identical so that the two products of the two factors speed and moment are always the same for the input and the output.

It has been known that a simple moment conversion operates, in the case of gear wheels, from the input through a layshaft to the output through two gear wheel bridges. Where more than one conversion is required, it is customary, for example in the case of a stage-type gearing, to arrange several such gear wheel stages between the input and the output, the power being transmitted through one or more layshafts.

Also in the case of the epicyclic or planetary system, the planet wheels are the layshaft gearings proper, if, for example, the inner or outer sun wheel constitutes the input. Where the planet wheel carrier is used as the input member, the two sun wheels have to be considered as layshaft or intermediate gears. In every case a gear wheel conversion is exclusively effected by way of suitable intermediate gears.

Now these intermediate gears, which are always carried in bearings in the vicinity of the central axis, absorb, by way of the tooth pressure, a bearing which always tends to yield opposite the tooth pressure and accordingly tends to carry with it the wall of the housing or the planet wheel carrier if, as is true in the latter case, the inner sun wheel constitutes the input member. In other words, the wall of the housing or the planet wheel carrier would rotate in a reverse sense in relation to the input member and the gear wheels would "walk" unless the said wall or the said planet wheel carrier were held stationary.

However, this force acting in an opposite direction, which force will be termed "reaction force" in what follows, exists only as long as there is a difference in torques between the input member and the output member. Thus, as soon as the two torques of the input gear wheel bridge and of the output gear wheel bridge are equal, the said reaction force ceases to exist, and now the wall of the housing or the planet wheel carrier tends to follow the same sense of rotation of the input member since the circumferential force of the drive is acting in this sense of rotation through the intermeshing gear teeth. This occurs, for example, in the case of the guide wheel of a Föttinger type converter after the conversion has been effected, if the guide wheel is not held stationary but is only held in the direction of the reaction force by means of a freewheel device.

If we now consider this effectiveness in the case of a planetary system in which the inner sun wheel constitutes the input wheel, while the planet wheel supported in a carrier of planet wheel basket constitute the intermediate gears, it being understood that the power output also flows from these intermediate gears in separate manner and again to an inner sun wheel, the planet wheel basket will be subject to the same effect as the above-mentioned guide wheel, if the said basket is held by a freewheel device only in the direction of the reaction force, i.e. in a direction opposite to the direction of the circumferential force. Thus, the reaction force ceases to exist, the basket follows the circumferential force in its tendency, if the conversion of the stage built in has been completed.

Now, a conversion would have been effected in a completely automatic manner through gear wheels at a reduction ratio up to direct power transmission, it being understood, however, that the direct transmission stage, depending on the magnitude of the reduction ratio and due to mass inertia, would develop only in a hesitant manner. The conversion of the stage would first have to be completely balanced with the input member before the direct power transmission would come into action. Above all, this would not be a stepless conversion. Also a plurality of successive stages, i.e. several planet wheel units of this type connnected in series, would not afford a stepless effect, while, however, improving the effect.

The present invention is based on the discovery that a stepless action can be obtained if the planet wheel basket, from the very beginning, could follow the tendency of the circumferential force rather than the tendency of the reaction force, and if, at the same time, after the completion of the smallest partial conversion, the circumferential force would always exceed the reduced reaction force by this amount. From this there can be derived the problem to find a transmission system operating through the planet wheel axes which would subdivide the reaction forces in such a manner that the one part together with the circumferential force is effective, for example, in a clockwise direction, while the other delivers its force in a direction opposed to that direction. In other words, the sum of the circumferential force and the reaction force in a clockwise direction must exactly equal the reaction force in a counter-clockwise direction.

The above problem can be solved and the desired transmission system can be found, if, for example, between the driving inner sun wheel and a coplanar outer sun wheel having internal teeth, there are arranged separately for rotation in the planet wheel basket, two oppositely located intermediate gear wheels serving as drive elements for the outer sun wheel, and two intermediate gearings or layshafts driven by the outer sun wheel and also oppositely located and respectively offset in relation to the said intermediate gear wheels by 90°, the intermediate gearings driven by the outer sun wheel having their output teeth in mesh with the inner sun wheel serving as the output member. In this case, the outer sun wheel can be floatingly supported by means of the intermediate gear wheels and the layshaft gear wheels. This system now will show the following effect.

In a clockwise direction, the inner driving sun wheel drives the intermediate gear wheels which in turn drive the outer sun wheel. Thus, the outer sun wheel will rotate in a counterclockwise direction. Thus, the reaction force of the tooth pressure to which the intermediate gear wheels are subjected will act in a clockwise direction, i.e. in the same direction as the circumferential force. This can be understood most easily by visualising the outer sun wheel which delivers the resistance as being held stationary. In that case the basket, if loose, would rotate clockwise together with the intermediate gear wheels. The opposite is true in the case of the output bridge, because now the outer sun wheel is the driving member and the inner output sun wheel is the driven member. This driven member again rotates in a clockwise direction. Now, if the output sun wheel is held stationary, the basket, together with the layshafts, will rotate counterclockwise according to the sense of rotation of the outer sun wheel. Thus, in this case the reaction force acts in an opposite direction to that of the circumferential force. The only problem still to be solved is to find an accurate layout of the various forces in relation to one another in order to obtain the desired equilibrium of the reaction forces in both directions in the planet wheel basket.

Since the reaction moment of the output member, i.e. the moment acting in the reverse sense of rotation, will always be multiplied in accordance with the built-in reduction ratio, it will always be necessary to use the stationary housing to support the excess over the input torque, if an equilibrium is to be obtained. Assuming that the input torque is 12 meter-kilograms, and that the built-in reduction ratio is 4:1, the output torque will be 48 meter-kilograms. The difference of 48−12=36 meter-kilograms will have to be supported by the housing. Thus, the planet gear basket will then be in a state of equilibrium, and the reduction ratio can become effective at the output member.

Now, if a support is effected which, in the exemplary embodiment, exceeds 36 meter-kilograms, there will be an excess in input torque. For example, if 38 meter-kilograms are supported, there will only remain 10 meter-kilograms acting in the planet gear basket as a reaction force acting in the reverse direction, and the reaction force introduced from the input member and acting in a positive direction will remain 12 meter-kilograms. Thus, 2 extra meter-kilograms come into action within the planet gear carrier in a positive sense of rotation as compared to the number of meter-kilograms acting in the negative sense of rotation. Therefore, the planet wheel basket will develop a positive tendency to rotate in positive direction in order to establish a state equilibrium. However, a rotation of this basket implies, according to the speed chart, that the distance at the output member will always become greater than at the input member. Thus a stepless conversion of the rotary speed introduced is effected.

However, this conversion is also effected in regard to the moments, since, with the basket rotating, the planet wheels do not act with a leverage corresponding to their radius as during "walking" but act with a leverage corresponding to their diameter, i.e. with their leverage doubled. Thus a branching-off of motor power for direct drive is effected. This branching-off increases continuously as long as the output moment is reduced, or conversely, the branching-off is reduced upon the output moment being increased. Thus, in the present case, initially 10 meter-kilograms of the 12 meter-kilograms introduced act by way of the gear reduction unit, while 2 meter-kilograms act through the direct output member. These 2 meter-kilograms are increased as the speed of the output member is increased, and when the planet gear basket has reached the input speed, the input torque of 12 meter-kilograms acts as a circumferential force on the planet wheel basket and the transmission ratio has reached 1:1. The continuous increase of the direct branching-off can occur along a curve whose gradient is either low or high, depending on whether the negative support results in a larger or smaller excess beyond the necessary moment being absorbed. The tendency towards the establishment of an equilibrium causes the planet wheel basket to rotate always in a positive direction and constantly to effect a stepless conversion, this tendency coming into effect until the full direct transmission at a 1:1 ratio is obtained. It is not before this point that an equilibrium is reached, i.e. before the tooth pressures and the accompanying reaction forces have ceased to exist.

In order to provide for the planet wheel basket to be capable of rotation in a positive direction and nevertheless to provide for the desired reverse force to be supported, the axle of the output planet wheel is extended at the opposite end thereof to extend beyond the planet wheel basket. This axle extension carries a freely rotatable gear wheel whose teeth are simultaneously in mesh with an externally toothed inner sun wheel and with an internally toothed outer sun wheel. Whilst the latter, i.e. the external sun wheel, is rigidly secured to the planet gear basket, the inner sun wheel which is provided with a freewheel device locking it against reverse rotation is supported for rotation by the stationary wall of the housing. Thus this inner sun wheel, while being capable of rotation in a positive direction, is held against rotation in a negative direction since the freewheel device will not permit rotation of the inner sun wheel in a negative direction in relation to the stationary wall of the housing.

Thus the force acting in a reverse direction at the output planet wheel axle which acts on the planet wheel basket and which is produced by the tooth pressure of the outer sun wheel and the inner sun wheel serving as an output member is supported to the extent of one half, through the loose gear wheel on the planet wheel axle, by the internal teeth of the planet wheel basket, the other half of the said force being supported from the stationary housing by way of the gear wheel provided with the said freewheel device. By suitably selecting the diameters of the three sets of teeth involved, i.e. of the loose gear wheel on the planet wheel axle, the inner teeth of the planet gear basket and the teeth of the free-wheel gear supported by the wall of the housing, it is possible to have either a larger or a smaller proportion of the reversely acting reaction torque supported by the housing and to have either a smaller or a larger proportion act upon the planet wheel basket.

Thus, the present invention provides a gear-type converter which operates in a completely automatic and stepless manner and which is furthermore adapted to load the motor always in its most favourable range so that the present converter, if used, for example, in an automotive vehicle, will automatically provide the optimum pattern of acceleration so as to ensure optimum efficiency.

Where it is intended to obtain a different direction of rotation such as is necessary, for example in an automotive vehicle which is to be backed, this rotation in an opposite direction can be obtained in a simple manner by means of a second output member in the form of a sun wheel, which, however, in this case is an outer sun wheel whose internal teeth engage in the output pinions of the intermediate gears.

The planet wheel basket may also be driven by means of a friction roller clutch, it being necessary to provide for the frictional force of the friction rollers on the driving clutch member to be increased exactly to the extent to which the reversely acting reaction force acting on the driven clutch member, i.e. on the planet wheel basket, is reduced by a reduction in the output torques.

This effect can be obtained with the aid of a centrifugal type of friction roller clutch, the frictional force of the friction rollers being produced by the increasing centrifugal force to which the friction rollers are subjected. Moreover, the friction roller race of the driven clutch member is provided with friction roll resistances which may occur in the form of recesses in the inner shell or through an elliptical shape of the roller race. This will enable the frictional force to a minor extent to carry the driven member with it, because any resistance presented to the radius of the roller race will increase the pressure acting in opposition to the centrifugal force of the friction roll. By this arrangement it is possible, where desired, still to keep the speed of the direct transmission of the converter at a low value with a low input torque.

Other objects and features of the invention will become apparent as the description proceeds, especially when taken in conjunction with the accompanying drawing illustrating preferred embodiments of the invention, wherein:

FIG. 6 is a longitudinal sectional view showing an additional arrangement affording independent rotation of the planet wheel basket, the arrangement being sectioned along line A—B in FIG. 4a;

FIG. 7 is similar to FIG. 6 but shows the arrangement sectioned along line C—D in FIG. 8;

Figure 1:
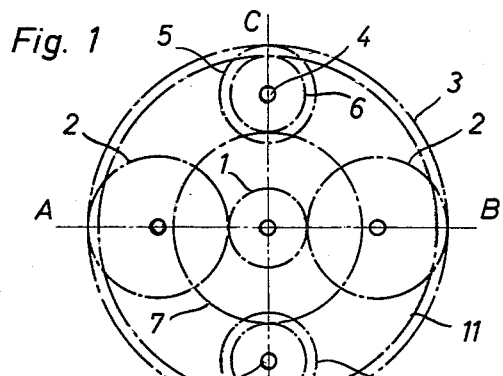
FIG. 1 is an end elevational view illustrating the arrangement of the pitch circles of the various gear wheels in a preferred embodiment of the invention.
Figure 2:
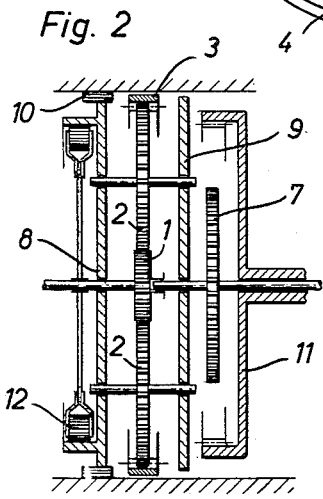
FIG. 2 is a longitudinal sectional view of the arrangement of FIG. 1 along line A—B.
Figure 3:
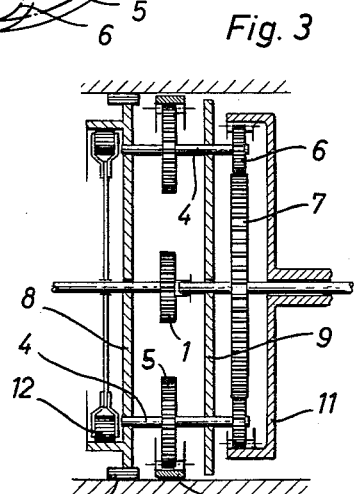
FIG. 3 is a longitudinal sectional view of the arrangement of FIG. 1 along line C—D.
Figure 4:
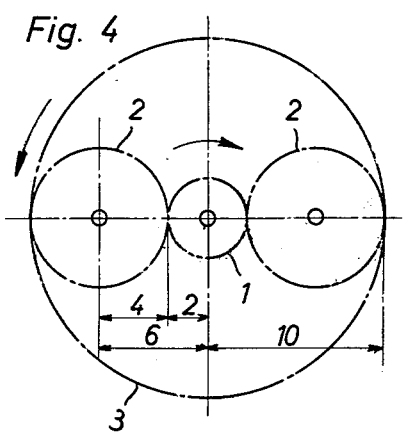
FIG. 4 is an end elevational view of the separate input gear wheel bridge.
Figure 5:
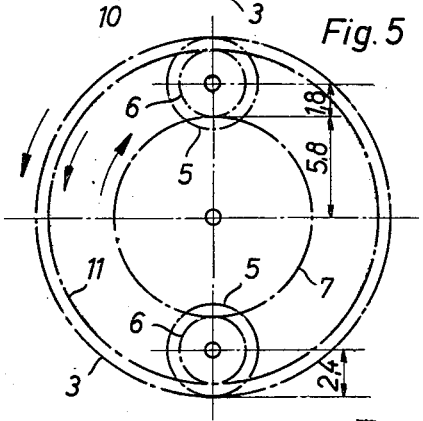
FIG. 5 is an end elevational view of the separate output gear wheel bridge.

FIG. 8 corresponds to FIG. 5 but shows an arrangement in which no speed reduction is effected by the teeth of the planet wheels acting as output members;

FIG. 9 is a view in the direction of the arrow E in FIG. 7 showing the three sets of teeth required to afford independent rotation of the planet wheel basket; this figure also shows the direction in which the freewheel device incorporated in the central gear wheel is capable of transmitting drive power;

FIGS. 4 and 5 illustrate special definitions.

In the drawings, 1 is the inner input sun wheel, 2 denotes the two intermediate gear wheels, 3 being the outer sun wheel. These elements constitute the input gear wheel bridge. The two layshafts 4 with gear wheels having sets of teeth 5 and 6 and the inner output sun wheel 7 constitute the output gear wheel bridge (see FIGS. 4 and 5). The intermediate gear wheels 2 and the teeth 5 of the layshafts 4 are disposed in a common plane and are in mesh with the internal teeth of the outer sun wheel 3. The two planet wheel carriers 8 and 9 which are rigidly held in assembly by suitable bolts constitute the planet wheel basket which is carried for free rotation on the central axle. A freewheel device 10 supports the planet wheel basket from the housing against the circumferential force. The planet wheel basket supports the rotatable intermediate gear wheels 2 and the layshafts 4 which are mutually offset by 90°. The sets of teeth 6 of the layshaft gears extend beyond the planet wheel basket and cooperate with the output sun wheel 7. At the same time the sets of teeth 6 are in mesh with a second outer sun wheel 11 which is intended for use in cases in which the vehicle is to be backed. There is also indicated in the drawings a friction roller clutch 12 which serves, at a predetermined and desired speed, to effect a positive drive connection between the planet wheel basket and the input shaft. The arrows in the drawings indicate the direction of rotation of the various gear wheels.

In the case of the additional arrangement shown in FIGS. 7 and 8 and affording independent rotation of the planet wheel basket, the two sets of teeth of the layshafts 4 have the same diameter. The oppositely acting reaction moments which are set up by the reaction forces occurring in the planet wheel basket are in the same relative proportion as the radii $a$ and $b$ in FIGS. 4a and 8. Therefore, the moment acting in a reverse direction will always be greater than the moment acting in a forward direction. These oppositely acting moments are balanced by means of the sets of teeth 15, 16 and 13. One-half each of the backward reaction pressure P in the output planet wheel shaft 4 is introduced by the gear wheel 15 which is freely rotatable on the said shaft into the teeth 16 of the planet wheel baskets 8, 9 and the teeth of gear wheel 13, respectively. The latter gear wheel is provided with a freewheel device 14 which locks the gear wheel against reverse rotation in relation to the stationary housing. The radii $c$ and $d$ (FIG. 9) effect either a balance of the reaction moments or a positive rotation of the planet wheel basket in a positive or negative direction. The arrow in FIG. 9 indicates the positive direction of rotation.

What is claimed is:

1. A torque converter comprising an input shaft and an output shaft disposed in alignment, an input sun gear on said input shaft, an output sun gear on said output shaft, and a planetary gear assembly mounted around said input sun gear and said output sun gear for driving said output sun gear from said input sun gear, said planetary gear assembly including an internal gear, a rotatable carrier, a first set of planetary gears carried by said carrier and meshed with both said input sun gear and said internal gear for driving said internal gear, and a second set of planetary gears carried by said carrier and meshed with said internal gear and another set of planetary gears carried by said carrier and fixed to said second set of planetary gears for rotation therewith and meshed with said output sun gear for driving said output sun gear, said sets of planetary gears being of different diameters.

2. The torque converter of claim 1 together with a reverse rotational output shaft, and a reverse output shaft ring gear engaged by the same set of planetary gears as that engaging said output sun gear.

3. The torque converter of claim 1 together with means for locking said gear assembly to said input shaft for rotation in unison therewith.

4. The torque converter of claim 1 together with free wheeling means for preventing reverse rotation of said planetary gear assembly.

5. The torque converter of claim 1 wherein said carrier has a second internal gear carried thereby, a free wheeling device including a third sun gear, and third planetary gears meshed with said second internal gear and said third gear for controlling the direction of rotation of said carrier.

6. The torque converter of claim 5 wherein said third planetary gears and said second set of planetary gears are carried by common shafts.

References Cited in the file of this patent

UNITED STATES PATENTS

| | | |
|---|---|---|
| 1,943,324 | Kendler | Jan. 16, 1934 |
| 2,301,497 | Alspaugh | Nov. 10, 1942 |
| 2,701,974 | Miller | Feb. 15, 1955 |
| 2,972,909 | Miller | Feb. 28, 1961 |